United States Patent
Nakatsukasa et al.

(10) Patent No.: US 12,335,823 B2
(45) Date of Patent: Jun. 17, 2025

(54) DATA TRANSFER DEVICE AND DATA TRANSFER METHOD

(71) Applicant: Mitsubishi Electric Corporation, Tokyo (JP)

(72) Inventors: Masahiro Nakatsukasa, Tokyo (JP); Hisao Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/269,331

(22) PCT Filed: Jan. 26, 2021

(86) PCT No.: PCT/JP2021/002518
§ 371 (c)(1),
(2) Date: Jun. 23, 2023

(87) PCT Pub. No.: WO2022/162712
PCT Pub. Date: Aug. 4, 2022

(65) Prior Publication Data
US 2024/0323656 A1    Sep. 26, 2024

(51) Int. Cl.
*H04W 4/38*    (2018.01)
*G07C 5/00*    (2006.01)
*H04L 47/25*    (2022.01)

(52) U.S. Cl.
CPC .............. *H04W 4/38* (2018.02); *G07C 5/008* (2013.01); *H04L 47/25* (2013.01)

(58) Field of Classification Search
CPC ........ H04W 4/38; H04W 24/02; G07C 5/008; H04L 47/25; H04L 67/12; H04L 1/1874
See application file for complete search history.

(56) References Cited

U.S. PATENT DOCUMENTS 6,636,785 B2 * 10/2003 Kuroda ................. G01C 21/26
                                                            701/1
9,455,925 B2 * 9/2016 Liu ......................... H04L 47/10
(Continued)

FOREIGN PATENT DOCUMENTS

| JP | 2019-41289 A | 3/2019 |
| JP | 2020-77915 A | 5/2020 |
| WO | 2019/188343 A1 | 10/2019 |

OTHER PUBLICATIONS

Office Action issued Jan. 9, 2024 in Japanese Application No. 2022-577813.
(Continued)

*Primary Examiner* — Alex H. Tran
(74) *Attorney, Agent, or Firm* — Sughrue Mion, PLLC

(57) ABSTRACT

Provided is a data transfer device capable of avoiding reduction in a data communication speed of a sensor in an area with a low wireless communication line speed while suppressing occurrence of overflow. The data transfer device includes: a data acquisition unit that acquires sensor data detected by a sensor at a first data communication speed; a communication unit that transmits the acquired sensor data to an external server at a second data communication speed; an accumulation amount calculating unit that calculates a temporal transition of a predicted accumulation amount of the acquired sensor data in a memory using the first data communication speed and the second data communication speed; and a determination unit that determines whether or not the sensor data to be accumulated in the memory will overflow on the basis of the temporal transition of the predicted accumulation amount.

8 Claims, 9 Drawing Sheets

(56) References Cited

U.S. PATENT DOCUMENTS

| | | | |
|---|---|---|---|
| 9,853,910 B2* | 12/2017 | Hayama | H04L 47/722 |
| 11,332,107 B2* | 5/2022 | Kim | B60T 8/1881 |
| 11,941,975 B2* | 3/2024 | Ogawa | G08G 1/0112 |
| 2019/0065425 A1 | 2/2019 | Noguchi et al. | |
| 2021/0005080 A1 | 1/2021 | Ogawa | |
| 2021/0344522 A1* | 11/2021 | Iwata | H04L 12/4641 |
| 2022/0303056 A1* | 9/2022 | Miyazaki | H04L 1/203 |

OTHER PUBLICATIONS

International Search Report for PCT/JP2021/002518 dated Apr. 6, 2021.

* cited by examiner

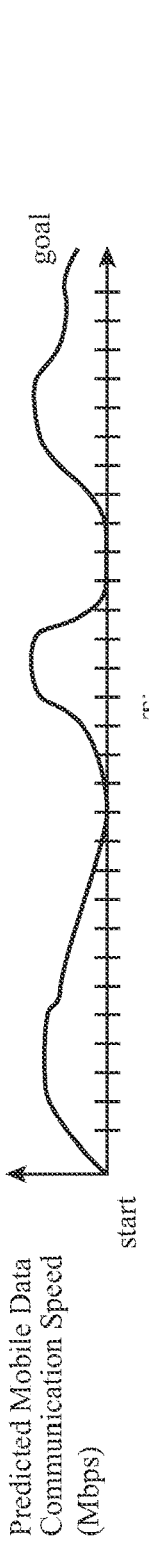
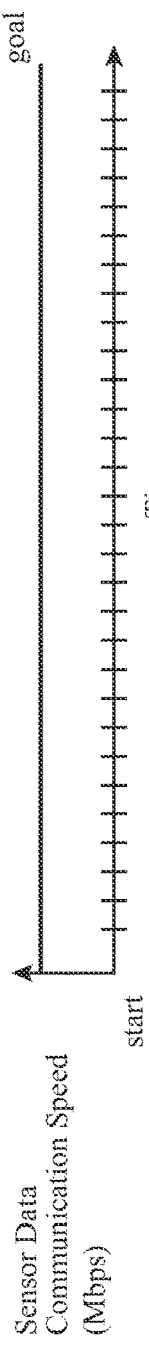
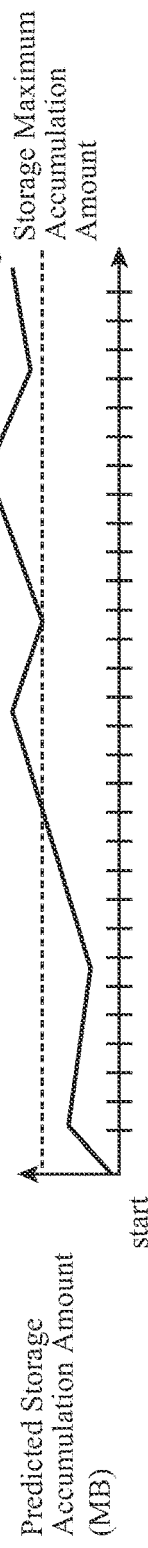
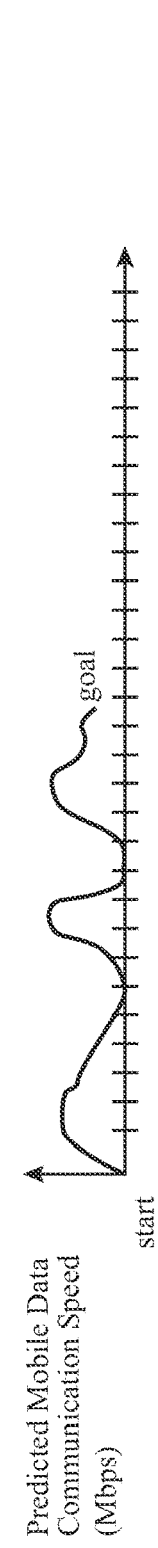
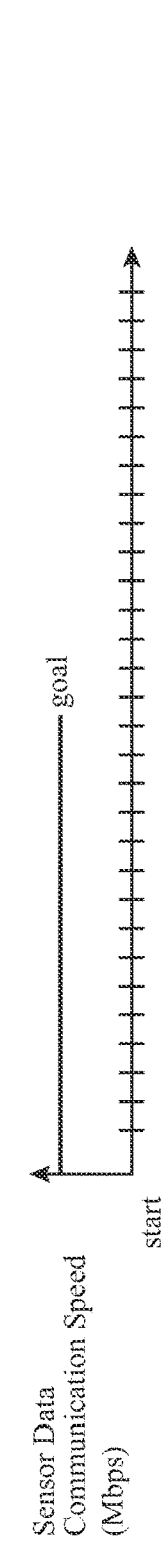
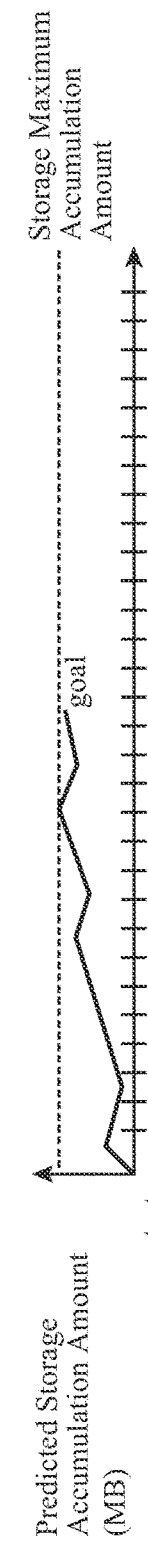

FIG. 6

| Priority | Target Sensor | Communication Speed | Period or Frequency | Resolution | Compression Ratio |
|---|---|---|---|---|---|
| 1 | Out-of-Vehicle Camera | x Mbps | Frame Rate ○ fps | Pixel Number MB | xxx % |
| 2 | In-Vehicle Camera | y Mbps | Frame Rate △ fps | Pixel Number MB | yyy % |
| 3 | LiDAR | z Mbps | □ ms | Data Amount MB | zzz % |
| ⋮ | ⋮ | ⋮ | ⋮ | | |

DATA TRANSFER DEVICE AND DATA TRANSFER METHOD

CROSS REFERENCE TO RELATED APPLICATIONS

This application is a National Stage of International Application No. PCT/JP2021/002518 filed Jan. 26, 2021.

TECHNICAL FIELD

The present disclosure relates to a data transfer device and a data transfer method.

BACKGROUND ART

A system that collects data acquired by a sensor mounted on a vehicle through a wireless communication line and uses the collected data for driving assistance of another vehicle is operated. As a technique that can be used in such a system, Patent Literature 1 discloses a technique in which an in-vehicle device acquires line speed information of a communication line in a scheduled vehicle traveling area from a server, and controls a sensor information collecting speed when sensor information detected by an in-vehicle sensor is input to a memory (transmission buffer) of the in-vehicle device on the basis of the acquired line speed information. More specifically, when the vehicle travels in an area with a lower line speed, the sensor information collecting speed is controlled to be slower (see claim 1 and FIGS. 6 and 7 of Patent Literature 1).

CITATION LIST

Patent Literature

Patent Literature 1: WO 2019/188343 A

SUMMARY OF INVENTION

Technical Problem

According to the technique of Patent Literature 1, since the sensor information collecting speed is controlled depending on the line speed information of the wireless communication line in the scheduled vehicle traveling area, occurrence of overflow in the memory can be suppressed.

However, according to the technique of Patent Literature 1, since the sensor information collecting speed depends on the line speed, there is a problem that the sensor information collecting speed is inevitably reduced in a section where the line speed is zero or low, such as a tunnel or a mountain area.

The present disclosure has been made in order to solve the above problem, and an object of one aspect of the embodiments is to provide a data transfer device capable of avoiding reduction in sensor data communication speed in an area with a low wireless communication line speed while suppressing occurrence of overflow.

Solution to Problem

An aspect of a data transfer device according to the embodiments includes: a processor to execute a program; and a memory to store the program which, when executed by the processor, performs processes of, acquiring sensor data detected by a sensor at a first data communication speed, transmitting the acquired sensor data to an external server at a second data communication speed, calculating a temporal transition of a predicted accumulation amount of the acquired sensor data in a memory using the first data communication speed and the second data communication speed, and determining whether or not the sensor data to be accumulated in the memory will overflow on a basis of the temporal transition of the predicted accumulation amount.

Advantageous Effects of Invention

An aspect of the data transfer device according to the embodiments can avoid a reduction in data communication speed of a sensor in an area with a low line speed while suppressing occurrence of overflow.

BRIEF DESCRIPTION OF DRAWINGS

FIG. 4A is a diagram illustrating a route on which a vehicle travels from a start point to a goal point. FIG. 4B is a diagram illustrating a temporal transition of a predicted mobile data communication speed along the travel route. FIG. 4C is a diagram illustrating a temporal transition of the predicted mobile data communication speed expressed by converting a distance axis of FIG. 4B into a time axis. FIG. 4D is a diagram illustrating a data communication speed of a sensor. FIG. 4E is a diagram obtained by integrating a difference between FIGS. 4C and 4D.

FIGS. 5A to 5C are diagrams for illustrating a temporal transition of a predicted storage accumulation amount in a case where a vehicle is at 50 km/h, and FIGS. 5D to 5F are diagrams for illustrating a temporal transition of a predicted storage accumulation amount in a case where the vehicle is at 100 km/h. FIG. 5A is a diagram illustrating a temporal transition of a predicted mobile data communication speed in which a horizontal axis represents time using a predicted vehicle speed value along a travel route. FIG. 5B is a diagram illustrating a data communication speed of a sensor. FIG. 5C is a diagram illustrating a temporal transition of a predicted storage accumulation amount. FIG. 5D is a diagram illustrating a temporal transition of a predicted mobile data communication speed in which the horizontal axis represents time. FIG. 5E is a diagram illustrating a data communication speed of the sensor. FIG. 5F is a diagram illustrating a temporal transition of a predicted storage accumulation amount.

FIG. 6 is an example of a sensor information table.

DESCRIPTION OF EMBODIMENTS

Figure 1:
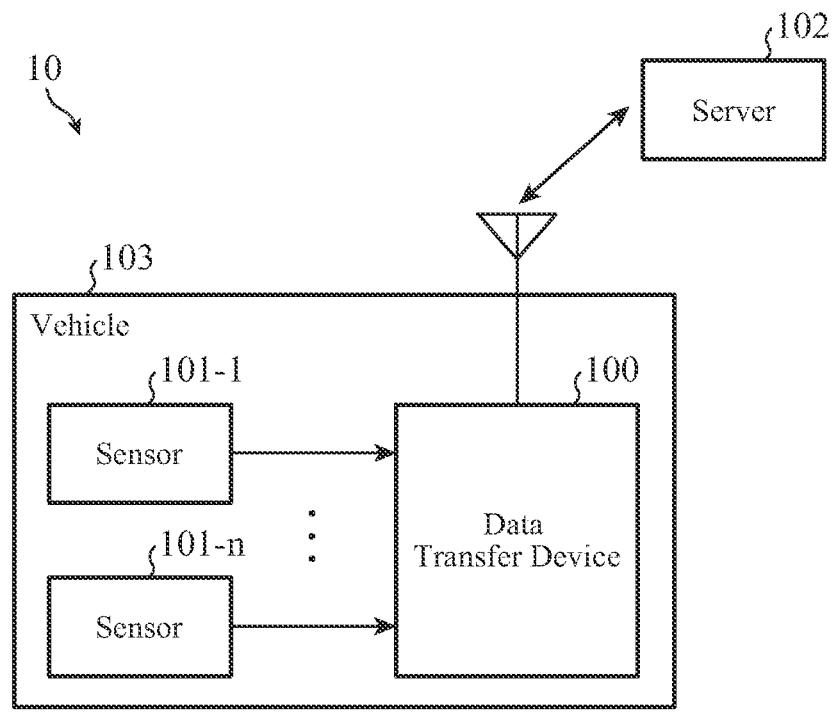
FIG. 1 is a diagram illustrating a configuration example of a data transfer system according to a first embodiment.

Hereinafter, various embodiments according to the present disclosure will be described in detail with reference to the drawings. Note that constituent elements denoted by the same reference numeral throughout the drawings have the same or similar configuration or the same or similar function.

First Embodiment

<Configuration>
(Data Transfer System)

A configuration example of a data transfer system including a data transfer device will be described with reference to FIG. 1. As illustrated in FIG. 1, a data transfer system 10 includes a data transfer device 100 and a server 102, and the data transfer device 100 and the server 102 can communicate with each other via a mobile communication line. As illustrated in FIG. 1, the data transfer device 100 can be used, for example, by being mounted on a movable vehicle 103. The vehicle 103 may be a vehicle driven by a person or an automatic traveling vehicle. In addition, the vehicle 103 may be a mobile object such as an automatic traveling robot on which no person is scheduled to get. The data transfer device 100 acquires data acquired by a plurality of sensors 101-1 to 101-$n$ (hereinafter, simply referred to as "sensor 101") included in the vehicle 103 from the sensor 101, and transmits the acquired data to the server 102 via a mobile communication line. Examples of the sensor 101 include a sensor for detecting a state around or inside the vehicle 103, such as a camera, a LiDAR, or a millimeter wave radar, and a sensor for grasping a traveling position of the vehicle 103, such as a global positioning system (GPS) sensor or a global navigation satellite system (GNSS) sensor. Examples of the mobile communication line include a communication line according to a standard such as long term evolution (LTE), 3 Generation (G), 4G, or 5G.

(Data Transfer Device)

Figure 2:
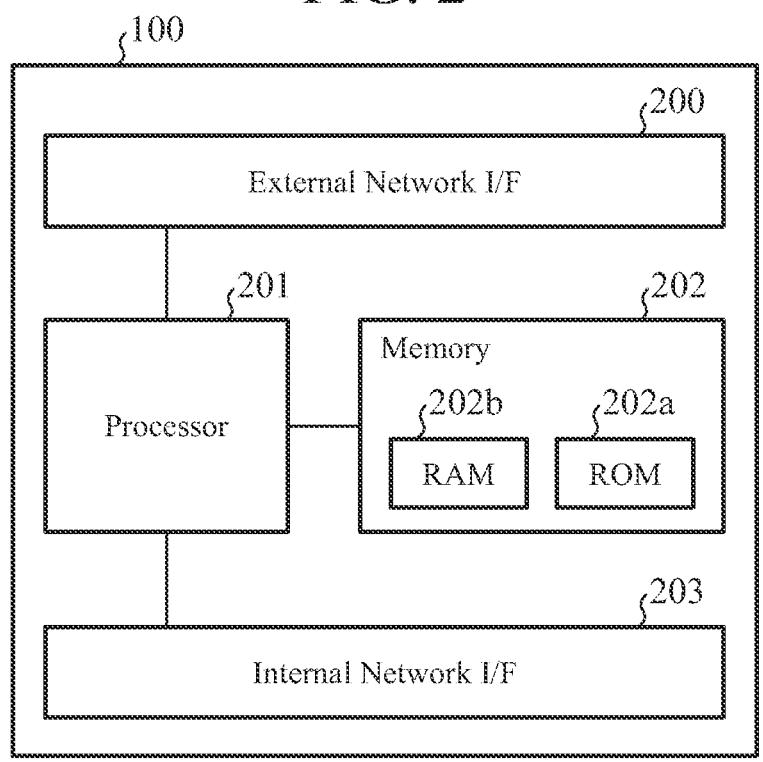
FIG. 2 is a diagram illustrating a configuration example of hardware of a data transfer device according to the first embodiment.

Next, a configuration example of hardware of the data transfer device 100 will be described with reference to FIG. 2. As illustrated in FIG. 2, the data transfer device 100 includes an external network I/F 200, a processor 201, a memory 202, and an internal network I/F 203. The processor 201 is connected to the external network I/F 200, the memory 202, and the internal network I/F 203.

(External Network I/F)

The external network I/F 200 is a wireless communication interface to be connected to a communication network outside the data transfer device 100. When the data transfer device 100 is mounted on the vehicle 103, the external network I/F 200 is connected to a communication network outside the vehicle 103 and communicates with a device (not illustrated) connected to the communication network.

(Processor and Memory)

By reading a single or a plurality of programs stored in the memory 202 from the memory 202 and executing the single or the plurality of programs, the processor 201 performs various functions described later. In addition to storing an execution program executed by the processor 201, the memory 202 provides storage for temporarily accumulating sensor data acquired by the sensor 101. The storage is ensured by execution of the execution program, and a maximum accumulation amount of the storage is set. The maximum accumulation amount of the storage may be set on the basis of a user input. In addition, the data transfer device 100 may receive information on the maximum accumulation amount of the storage from the server 102, and the setting of the maximum accumulation amount of the storage may be updated. As the memory 202, a nonvolatile memory that stores an execution program, such as a read only memory (ROM) 202$a$, and a volatile memory that temporarily stores the execution program and data referred to by the execution program, such as a random access memory (RAM) 202$b$ are used. The memory 202 may be disposed outside the data transfer device 100.

Note that a dedicated processing circuit may be used instead of the processor 201. In this case, the memory is used as a medium that provides storage for temporarily accumulating sensor data, and the maximum accumulation amount of the storage is set by the processing circuit. The maximum accumulation amount of the storage may be set on the basis of a user input. In addition, the data transfer device 100 may receive information on the maximum accumulation amount of the storage from the server 102, and the setting of the maximum accumulation amount of the storage may be updated. Examples of the processing circuit include a single circuit, a composite circuit, a programmed processor, a parallel programmed processor, an application specific integrated circuit (ASIC), a field programmable gate array (FPGA), and a combination thereof.

(Internal Network I/F)

The internal network I/F 203 is a wired communication interface for communicating with a device used in combination with the data transfer device 100. When the data transfer device 100 is mounted on the vehicle 103, the internal network I/F 203 communicates with a sensor such as a camera, a LiDAR, or a GPS mounted on the vehicle 103. Examples of the internal network I/F 203 include a sensor I/F, Ethernet, and CAN.

Figure 3:
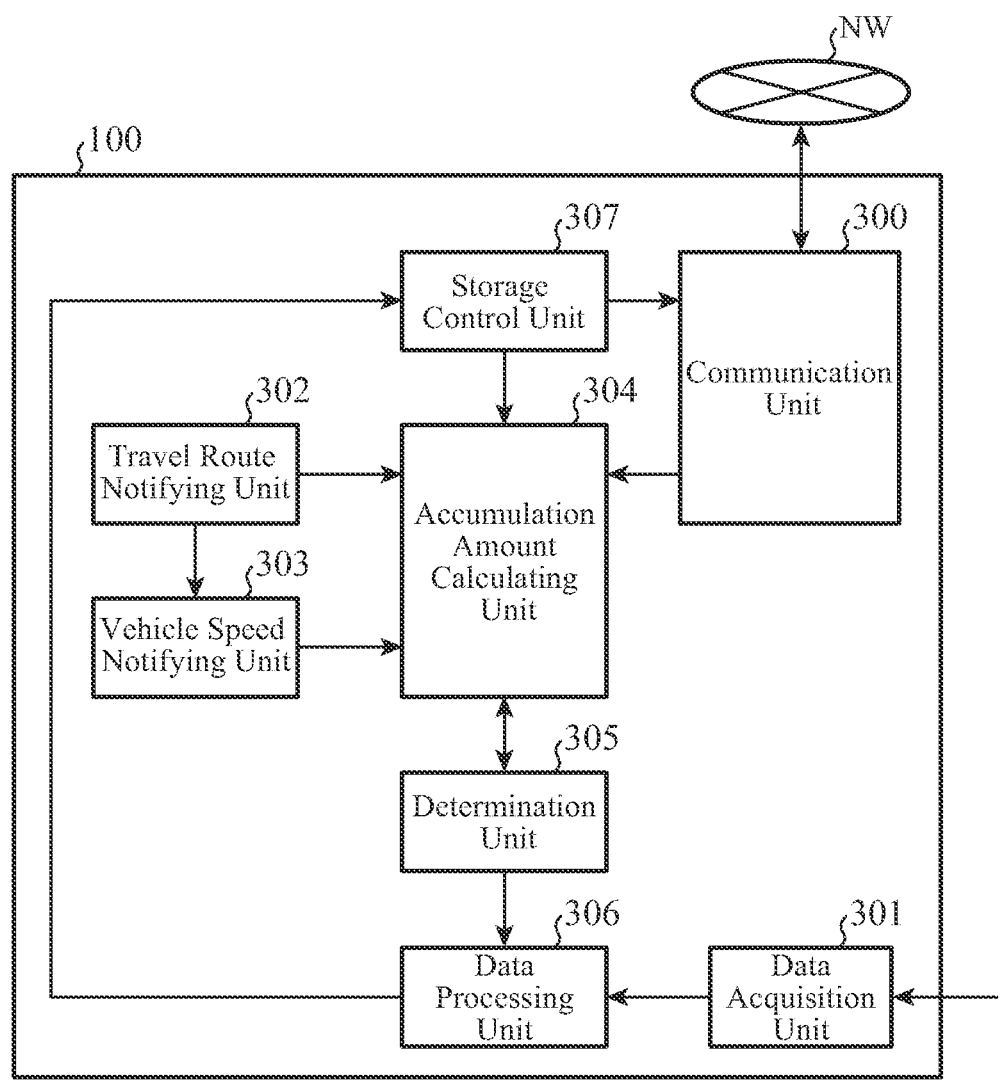
FIG. 3 is a block diagram illustrating a functional configuration of the data transfer device according to the first embodiment.

Next, a functional configuration of the data transfer device 100 will be described with reference to FIG. 3. As illustrated in FIG. 3, the data transfer device 100 includes a communication unit 300, a data acquisition unit 301, a travel route notifying unit 302, a vehicle speed notifying unit 303, an accumulation amount calculating unit 304, a determination unit 305, a data processing unit 306, and a storage control unit 307.

(Data Acquisition Unit)

The data acquisition unit 301 acquires sensor data acquired by various sensors such as a camera, a LiDAR, and a GPS mounted on the vehicle from the various sensors. The data acquisition unit 301 transmits the acquired sensor data to the data processing unit 306. The data acquisition unit 301 is implemented by the internal network I/F 203.

(Data Processing Unit)

The data processing unit 306 receives the sensor data from the data acquisition unit 301. In addition, as described later, the data processing unit 306 receives processing information regarding processing of the sensor data from the determination unit 305. Examples of the processing information include information regarding a period or a frequency, information regarding a resolution, and information regarding a compression ratio. The data processing unit 306 processes the sensor data according to the processing information. Examples of the processing include thinning, reduction in resolution, and change in compression ratio. As an example, when receiving information regarding a period or a frequency, the data processing unit 306 thins the sensor data according to the information regarding the period or the frequency. As an example, when receiving information regarding a resolution, the data processing unit 306 reduces the resolution of the sensor data according to the information regarding the resolution. As an example, when receiving information regarding a compression ratio, the data processing unit 306 compresses the sensor data according to the information regarding the compression ratio. The data processing unit 306 transmits the sensor data processed according to the processing information to the storage control unit 307. The data processing unit 306 is implemented by, for example, an execution program being read from the memory 202 and executed by the processor 201. The data processing unit 306 may be implemented by a processing circuit (not illustrated).

(Storage Control Unit)

The storage control unit 307 accumulates the processed sensor data received from the data processing unit 306 in the storage of the memory 202. In addition, the storage control unit 307 notifies the accumulation amount calculating unit 304 of information regarding a state of the storage, such as a maximum accumulation amount of the storage or an accumulation amount of the sensor data accumulated in the storage. In addition, in order to transmit the data accumulated in the storage of the memory 202 to the server 102, the storage control unit 307 gives notification to transmit sensor data to be transmitted to the server 102 to the communication unit 300. The storage control unit 307 is implemented by, for example, an execution program being read from the memory 202 and executed by the processor 201. The storage control unit 307 may be implemented by a processing circuit (not illustrated).

(Communication Unit)

The communication unit 300 is a communication unit that communicates with an external device via a communication network NW. The communication unit 300 transmits the sensor data to be transmitted, of which notification has been given by the storage control unit 307, to the server 102 via the communication network NW. In addition, the communication unit 300 transmits information regarding mobile communication received from the server 102 to the accumulation amount calculating unit 304. The communication unit 300 is implemented by the external network I/F 200.

(Travel Route Notifying Unit)

The travel route notifying unit 302 acquires a travel route on which the vehicle is scheduled to travel, and transmits the acquired travel route to the vehicle speed notifying unit 303 and the accumulation amount calculating unit 304. The travel route may be calculated by a navigation device (not illustrated) mounted on the vehicle, or may be calculated by an external server (for example, the server 102). The navigation device (not illustrated) and the data transfer device 100 may be integrated. The travel route notifying unit 302 is implemented by, for example, an execution program being read from the memory 202 and executed by the processor 201. The travel route notifying unit 302 may be implemented by a processing circuit (not illustrated).

(Vehicle Speed Notifying Unit)

The vehicle speed notifying unit 303 predicts a vehicle speed on the travel route acquired from the travel route notifying unit 302, and transmits the vehicle speed to the accumulation amount calculating unit 304. The prediction of the vehicle speed is calculated, for example, from a legal speed on the travel route. When there is a history of traveling on the travel route in the past, the prediction of the vehicle speed may be calculated from a travel speed at the time of traveling on the travel route in the past. The vehicle speed notifying unit 303 is implemented by, for example, an execution program being read from the memory 202 and executed by the processor 201. The vehicle speed notifying unit 303 may be implemented by a processing circuit (not illustrated).

(Accumulation Amount Calculating Unit)

The accumulation amount calculating unit 304 holds a sensor information table in which values related to parameters such as communication speeds and periods of various sensors are described, and calculates a predicted accumulation amount of sensor data to be accumulated in the storage of the memory 202. Note that the communication speed of the sensor may be referred to as a sensor data communication speed below. The accumulation amount calculating unit 304 is implemented by, for example, an execution program being read from the memory 202 and executed by the processor 201. The accumulation amount calculating unit 304 may be implemented by a processing circuit (not illustrated).

FIG. 6 is a diagram illustrating an example of the sensor information table. As illustrated in FIG. 6, in the sensor information table, values for items of a communication speed (that is, a sensor data communication speed), a period or a frequency, a resolution, and a compression ratio regarding a target sensor are included as default values. When the sensor data communication speed is changed by processing in step B5 in the flowchart of FIG. 8 described later, the default values are rewritten by the accumulation amount calculating unit 304 so as to conform to a changed sensor data communication speed. When the vehicle arrives at a destination, the values in the table are returned to the default values.

In order to calculate a predicted accumulation amount, the accumulation amount calculating unit 304 uses information received from the communication unit 300, the storage control unit 307, the travel route notifying unit 302, and the vehicle speed notifying unit 303 in addition to the information on the sensor information table.

Figure 4A:
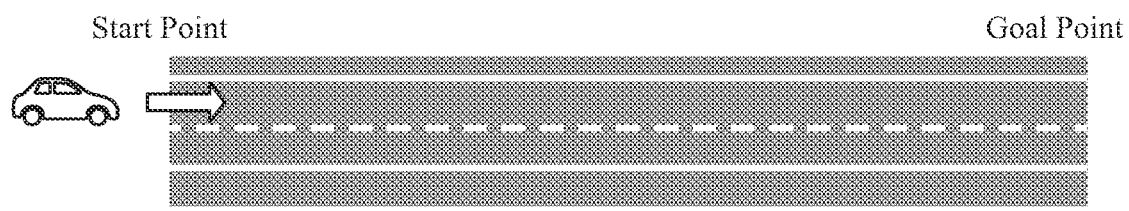
FIGS. 4A to 4E are diagrams for illustrating a temporal transition of an amount of data to be accumulated in storage.
Figure 4B:
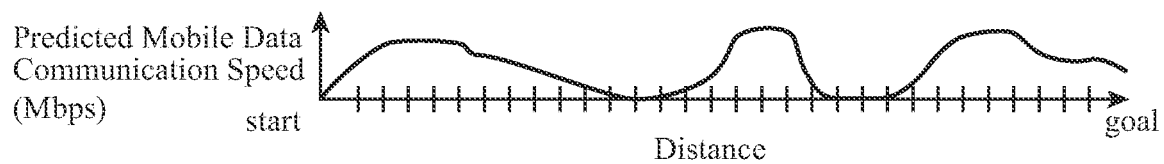
Figure 4C:
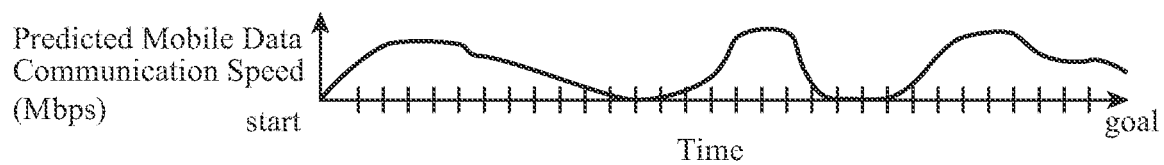
Figure 4D:
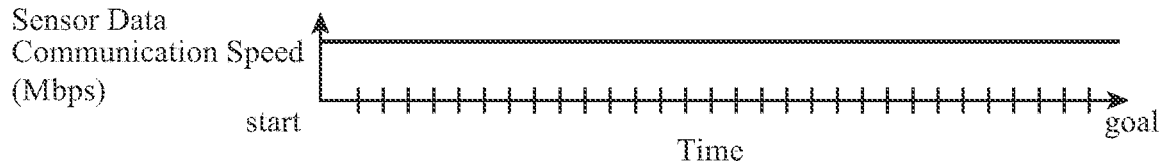
Figure 4E:
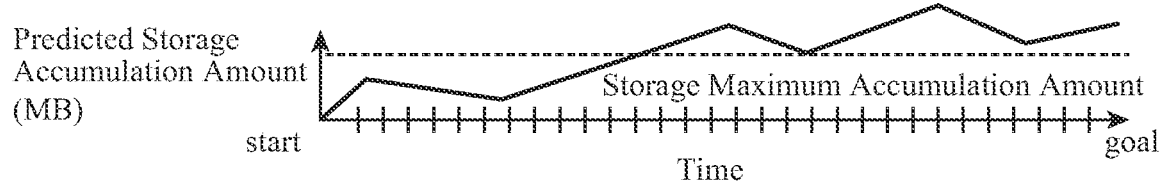

Here, a method for calculating the predicted accumulation amount will be described with reference to FIGS. 4A to 4E. FIG. 4A is a diagram illustrating a route on which the vehicle travels from a start point to a goal point, acquired from the travel route notifying unit 302. FIG. 4B is a diagram illustrating a temporal transition of a predicted mobile data communication speed along the travel route, acquired from the communication unit 300. FIG. 4C is a diagram illustrating a temporal transition of the predicted mobile data communication speed expressed by converting the distance axis of FIG. 4B into a time axis using a predicted vehicle speed value along the travel route acquired from the vehicle speed notifying unit 303. By dividing a distance by the predicted vehicle speed value, the distance axis is converted into the time axis. FIG. 4D is a diagram illustrating a data communication speed of a certain sensor, for example, an out-of-vehicle camera, acquired from the sensor information table. FIG. 4E is a diagram obtained by integrating a difference between FIGS. 4C and 4D. That is, FIG. 4E is a diagram obtained by integrating a value obtained by subtracting the predicted mobile data communication speed of FIG. 4C from the sensor data communication speed of FIG. 4D with time. In FIG. 4E, the solid line represents an integral value, and the broken line represents a storage maximum accumulation amount. Data overflow occurs in a portion where the solid line exceeds the broken line.

Here, a reason why the temporal transition of the predicted mobile data communication speed is converted from the distance axis of FIG. 4B to the time axis of FIG. 4C will be described with reference to FIGS. 5A to 5F. FIGS. 5A to 5C are diagrams for illustrating a temporal transition of a predicted storage accumulation amount in a case where a vehicle is at 50 km/h, and FIGS. 5D to 5F are diagrams for illustrating a temporal transition of a predicted storage accumulation amount in a case where the vehicle is at 100 km/h. FIGS. 5A and 5D are each a diagram illustrating a temporal transition of a predicted mobile data communication speed in which the horizontal axis represents time using a predicted vehicle speed value along a travel route. FIGS. 5B and 5E are each a diagram illustrating a data communication speed of a sensor (for example, an out-of-vehicle camera). FIGS. 5C and 5F are each a diagram illustrating a temporal transition of a predicted storage accumulation amount. Even when a travel distance is the same, if a vehicle speed is different, time for reaching a destination is different. That is, as the vehicle speed is slower, it takes a longer time to reach the destination. Therefore, when a time during which the predicted mobile data communication speed is slower than the sensor data communication speed lasts long, sensor data is accumulated in the storage, and overflow may occur. For example, as illustrated in FIGS. 5D to 5F, in a case where the vehicle travels at 100 km/h, no overflow occurs. However, as illustrated in FIGS. 5A to 5C, in a case where the vehicle travels at 50 km/h, a time during which the sensor data communication speed is faster than the predicted mobile data communication speed lasts longer than that in a case where the vehicle travels at 100 km/h. Therefore, the accumulation amount of sensor data in the storage increases, and overflow occurs. As in the embodiment of the present disclosure, by converting the predicted mobile data communication speed predicted on the travel route from the distance axis to the time axis, it is possible to accurately determine whether or not overflow will occur.

In this manner, the accumulation amount calculating unit 304 calculates the predicted accumulation amount using information received from the communication unit 300, the travel route notifying unit 302, and the vehicle speed notifying unit 303 in addition to the information on the sensor information table. In addition, the accumulation amount calculating unit 304 may calculate the predicted accumulation amount after a certain time received from the storage control unit 307 on the basis of the state of the storage (accumulation amount of sensor data accumulated in the storage) at the certain time.

Returning to FIG. 3, the accumulation amount calculating unit 304 transmits the information on the temporal transition of the predicted accumulation amount and the information on the storage maximum accumulation amount to the determination unit 305. In addition, the accumulation amount calculating unit 304 transmits the values of the parameters of the various sensors in the sensor information table to the determination unit 305. In addition, as described later, when receiving a notification that overflow will occur in the storage of the memory 202 from the determination unit 305, the accumulation amount calculating unit 304 calculates a total communication speed at which no overflow occurs. A method of this calculation will be described later with reference to a flowchart. The accumulation amount calculating unit 304 rewrites the values of the parameters of the sensor information table in such a manner that the total communication speed is the calculated total communication speed, and calculates the predicted accumulation amount of the sensor data to be accumulated in the storage of the memory 202 again using the rewritten values. The predicted accumulation amount calculated again is output to the determination unit 305.

(Determination Unit)

The determination unit 305 determines whether overflow will occur from the information on the temporal transition of the predicted accumulation amount and the information on the storage maximum accumulation amount output from the accumulation amount calculating unit 304. For example, it is determined that overflow will occur when the predicted accumulation amount exceeds the storage maximum accumulation amount, and that no overflow will occur when the predicted accumulation amount is equal to or less than the storage maximum accumulation amount. When it is determined that overflow will occur, a notification that overflow will occur is made to the accumulation amount calculating unit 304. When it is determined that no overflow will occur, pieces of processing information (a period or a frequency, a resolution, or a compression ratio) of various sensors in the sensor information table, that is, parameter values are transmitted to the data processing unit 306. The determination unit 305 is implemented by, for example, an execution program being read from the memory 202 and executed by the processor 201. The determination unit 305 may be implemented by a processing circuit (not illustrated).

<Operation>

Figure 7:
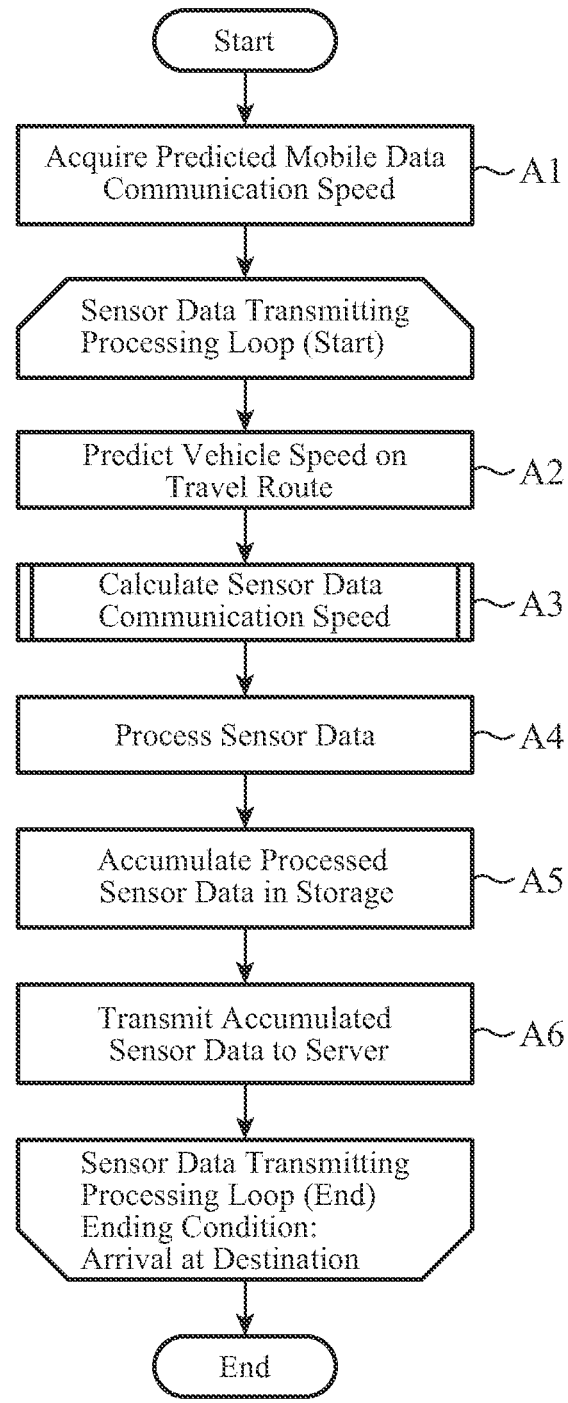
FIG. 7 is a flowchart of the data transfer device according to the first embodiment.
Figure 8:
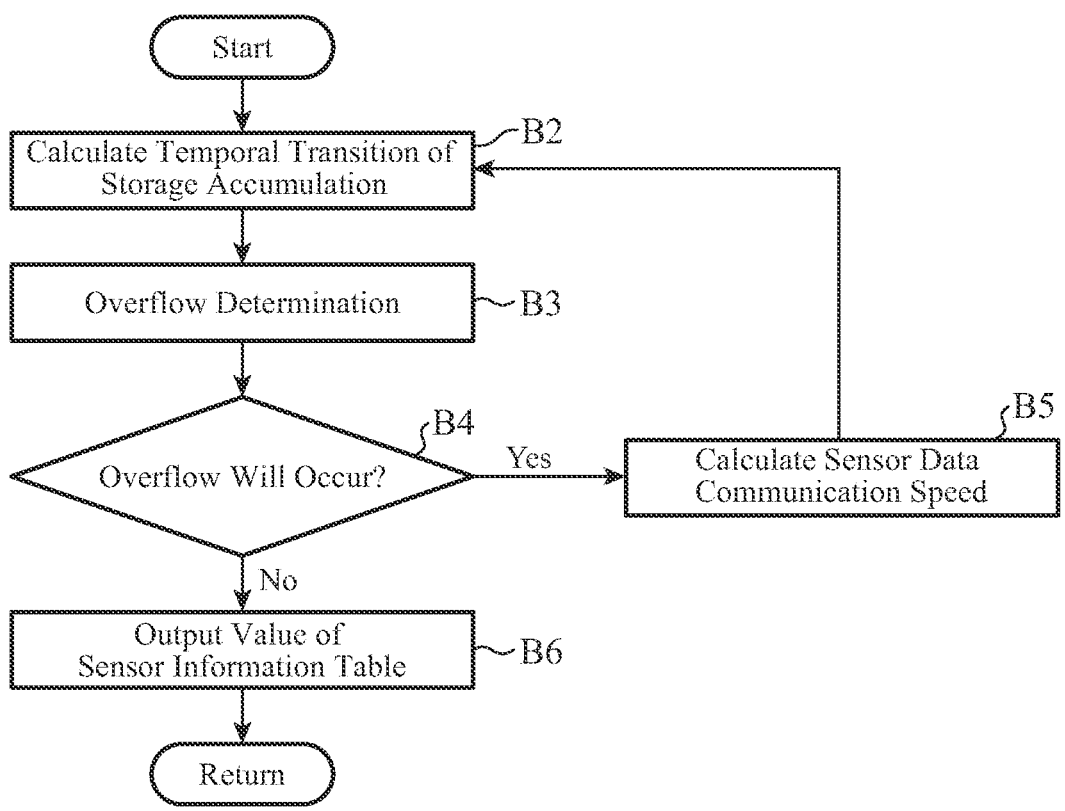
FIG. 8 is a flowchart illustrating a subroutine of sensor data communication speed calculating processing according to the first embodiment.

Next, an operation of the data transfer device 100 will be described with reference to FIGS. 7 and 8. FIG. 7 is a flowchart of the data transfer device 100, and FIG. 8 is a flowchart illustrating a subroutine of sensor data communication speed calculating processing in step A3 of FIG. 7. In FIG. 7, processing in step A1 is performed at start of traveling of the vehicle, and is also performed when the route is changed while the vehicle is traveling. Processing in steps A2 to A5 is executed at start of traveling and is also executed periodically during traveling. A period is any changeable value, and may be set according to information regarding the period received from the server 102. Hereinafter, each of the steps will be described in detail.

In step A1, the accumulation amount calculating unit 304 acquires a predicted mobile data communication speed predicted in each area including the travel route from the server 102 via the communication unit 300. As an example, the server 102 accumulates predicted mobile data communication speeds, position information, and time information of a plurality of vehicles that have traveled on the travel route in the past, and the predicted mobile data communication speed is predicted using the data accumulated by the server 102. The predicted mobile data communication speed may be calculated by another method. A timing when the predicted mobile data communication speed is acquired is start of traveling. During traveling, the predicted mobile data communication speed is not acquired unless the route is changed.

In step A2, the vehicle speed notifying unit 303 calculates a predicted vehicle speed value associated with position information on the travel route using the travel route information input from the travel route notifying unit 302. The predicted vehicle speed value is calculated from a legal speed of a road on the travel route or a driving tendency of a driver. The vehicle speed is predicted, for example, at start of traveling. The vehicle speed may be predicted periodically during traveling, or may be predicted using accident information on the travel route as a trigger. The period is, for example, a time interval of 30 minutes or one hour. The period can be set to any value, and period information may be obtained from the server 102. The trigger information may also be obtained from the server 102. The vehicle speed notifying unit 303 transmits the calculated predicted vehicle speed value to the accumulation amount calculating unit 304. When a predicted vehicle speed value calculated in a predetermined period is changed from a predicted vehicle speed value calculated immediately before, the vehicle speed notifying unit 303 transmits a newly calculated predicted vehicle speed value to the accumulation amount calculating unit 304. By providing the new predicted vehicle speed value when the predicted vehicle speed value is changed, it is possible to maintain the accuracy of the temporal transition of the predicted storage accumulation amount even when the vehicle speed changes during traveling due to an event such as congestion.

In step A3, sensor data communication speed calculating processing is performed. Details of the sensor data communication speed calculating processing will be described with reference to FIG. 8. In step B2 of FIG. 8, the accumulation amount calculating unit 304 calculates a temporal transition of the predicted mobile data communication speed in each area acquired from the server 102 using the predicted vehicle speed value input from the vehicle speed notifying unit 303 as illustrated in FIG. 4C. That is, the accumulation amount calculating unit 304 calculates a predicted mobile data communication speed represented by the time axis by dividing the predicted mobile data communication speed represented by the distance axis acquired from the server 102 by the predicted vehicle speed value. Then, the temporal transition of the sensor data communication speed is calculated as illustrated in FIG. 4D. The sensor data communication speed is acquired by referring to the sensor information table illustrated in FIG. 6. The accumulation amount calculating unit 304 calculates the temporal transition of the predicted storage accumulation amount as illustrated in FIG. 4E by integrating a value obtained by subtracting the predicted mobile data communication speed of FIG. 4C from the sensor data communication speed of FIG. 4D with time. The accumulation amount calculating unit 304 supplies the calculated temporal transition of the predicted storage accumulation amount to the determination unit 305.

In step B3, the determination unit 305 determines whether or not overflow will occur in the storage using the temporal transition of the predicted storage accumulation amount received from the accumulation amount calculating unit 304. The broken line illustrated in FIG. 4E represents a storage maximum accumulation amount, and whether or not overflow will occur is determined by whether or not the calculated predicted storage accumulation amount exceeds the storage maximum accumulation amount. Specifically, when the predicted storage accumulation amount exceeds the storage maximum accumulation amount, it is determined that overflow will occur, and when the predicted storage accumulation amount does not exceed the storage maximum accumulation amount, it is determined that no overflow will occur.

If it is determined that no overflow will occur, the process branches at step B4 and proceeds to step B6. In step B6, the determination unit 305 outputs a value of the sensor information table to the data processing unit 306.

If it is determined that overflow will occur, the process branches at step B4 and proceeds to step B5. In step B5, the determination unit 305 notifies the accumulation amount calculating unit 304 that overflow will occur, and the accumulation amount calculating unit 304 calculates a sensor data communication speed (third data communication speed) at which no overflow occurs.

The sensor data communication speed (third data communication speed) is calculated by the following procedure. A data amount exceeding the storage maximum accumulation amount is integrated during a time from start of traveling to arrival at a destination, and a total amount exceeding the storage maximum accumulation amount (hereinafter, referred to as a "total excess amount") is calculated. Meanwhile, during the time from the start of traveling to the arrival at the destination, a total amount of sensor transmission data input to the storage at the sensor data communication speed before the change and transmitted from the sensor is calculated. Then, the sensor data communication speed is calculated according to the following equation (1).

$$\text{Sensor data communication speed} = \frac{[\text{Total amount of sensor transmission data} - (\text{Total excess amount} + \alpha)]}{\text{Travel time}} \quad \text{Equation (1)}$$

That is, the accumulation amount calculating unit 304 calculates the sensor data communication speed by subtracting an amount obtained by adding any value a to the total excess amount of the storage from the total amount of the sensor transmission data and dividing the subtracted value by the travel time from the start of traveling to the arrival at the destination. The accumulation amount calculating unit 304 changes a corresponding communication speed in the sensor information table of FIG. 6 according to the calculated sensor data communication speed.

Furthermore, the accumulation amount calculating unit 304 updates the processing information in the sensor information table to satisfy the calculated sensor data communication speed. That is, the accumulation amount calculating unit 304 changes values of all or some of the items of the period or frequency, the resolution, and the compression ratio to satisfy the calculated sensor data communication speed. For example, a frame rate of a camera is changed from 30 [fps] to 20 [fps]. When there is a plurality of sensors, the sensor data communication speed is reduced in ascending order of priority to get a sensor data communication speed (total value) at which no overflow occurs. An upper limit value may be set for a reducing width per one time for a sensor, or a minimum value may be set for each sensor communication speed. The priority may be determined for each application, or information may be obtained from the server 102. By processing the sensor data on the basis of the priority of the sensor in this manner, it is possible to suppress a data amount of the sensor data of less importance, and thus, it is possible to maintain the quality of the sensor data of high importance as much as possible. If the accumulation amount calculating unit 304 performs the processing in step B2 again and the determination unit 305 performs the processing in step B3 again and no overflow occurs (No in step B4), the determination unit 305 outputs the latest values of a period or frequency, a resolution, and a compression ratio of each sensor to the data processing unit 306 (step B6), and the process returns to the main routine of FIG. 7.

In step A4, the data processing unit 306 processes the sensor data supplied from the data acquisition unit 301 using the values of a period or frequency, a resolution, and a compression ratio supplied from the accumulation amount calculating unit 304 via the determination unit 305. As an example, when receiving information regarding a period or a frequency, the data processing unit 306 thins the sensor data according to the information regarding the period or the frequency. As an example, when receiving information regarding a resolution, the data processing unit 306 reduces the resolution of the sensor data according to the information regarding the resolution. As an example, when receiving information regarding a compression ratio, the data processing unit 306 compresses the sensor data according to the information regarding the compression ratio. The data processing unit 306 transmits the processed sensor data to the storage control unit 307.

In step A5, the storage control unit 307 accumulates the received sensor data in the storage.

In step A6, the storage control unit 307 transmits the sensor data accumulated in the storage as needed during traveling to the server 102 via the communication unit 300.

According to the data transfer device 100 described above, the accumulation amount calculating unit 304 calculates the temporal transition of the predicted accumulation amount of the sensor data acquired by the data acquisition unit 301 in the storage of the memory 202 using a speed at which the sensor data detected by the sensor is acquired (first data communication speed) and a speed at which the acquired sensor data is transmitted to the server 102 (second data communication speed). In addition, the determination unit 305 determines whether or not the sensor data accumulated in the storage of the memory 202 will overflow on the basis of the temporal transition of the predicted accumulation amount. In this manner, since the accumulation amount of the sensor data to be accumulated in the storage of the memory is predicted and it is determined whether or not overflow will occur in the storage of the memory, it is possible to avoid reduction in the sensor data communication speed in an area with a low wireless communication line speed. That is, even when movement in an area with a low wireless communication line speed is predicted, it is determined that no overflow will occur if the predicted accumulation amount is low and the storage of the memory has enough capacity. Therefore, it is possible to avoid reduction in the sensor data communication speed in an area with a low wireless communication line speed.

Second Embodiment

In the first embodiment, since a predicted value is used for each of the vehicle speed and the mobile communication speed, the prediction value may be different from a measured value. Therefore, in the second embodiment, the sensor data communication speed is corrected using measured values of the vehicle speed and the mobile communication speed, and the accuracy of the temporal transition of the predicted storage accumulation amount is increased. Hereinafter, a data transfer device 500 according to the second embodiment will be described with reference to FIGS. 2, 6, 9, and 10. Note that description overlapping with the first embodiment will be omitted.

<Configuration>

Figure 9:
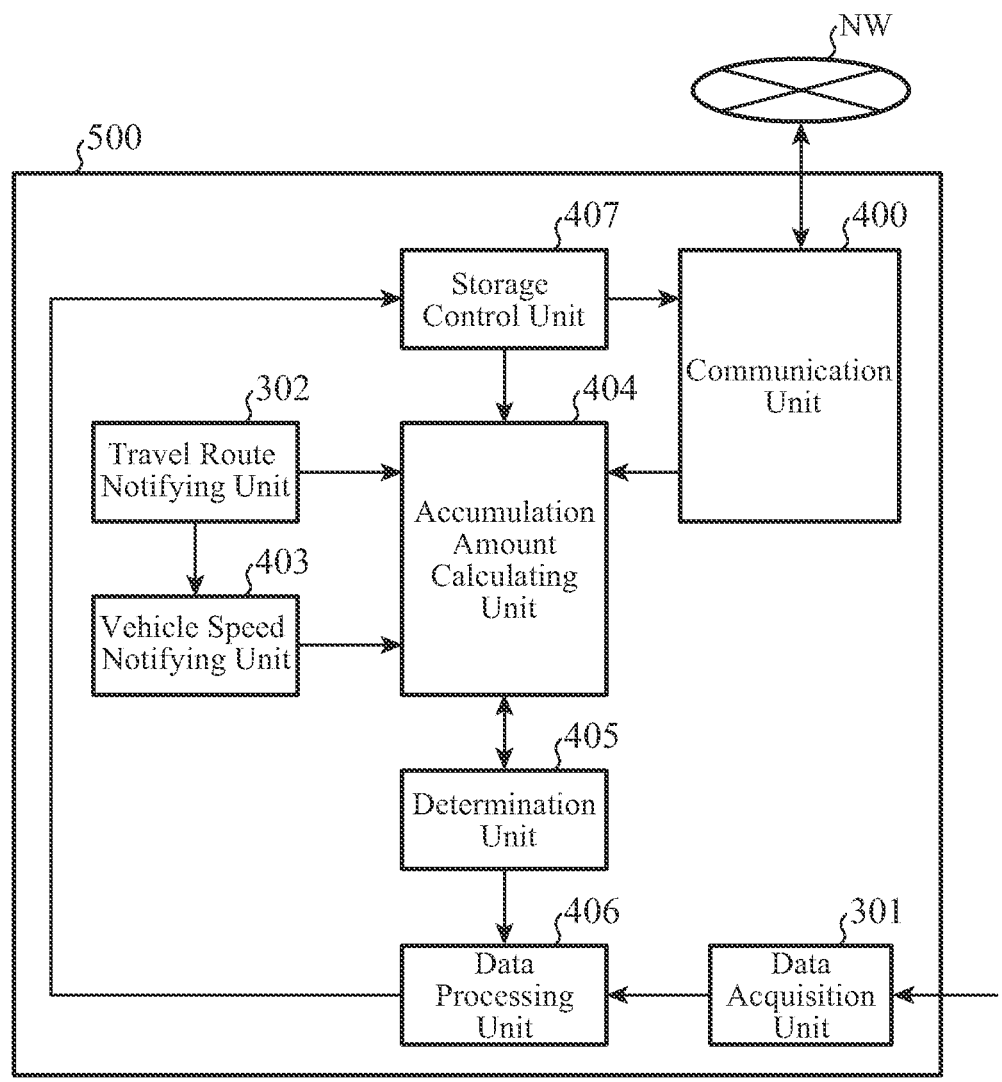
FIG. 9 is a block diagram illustrating a functional configuration of a data transfer device according to a second embodiment.

As illustrated in FIG. 9, the data transfer device 500 includes a data acquisition unit 301 and a travel route notifying unit 302 as in the first embodiment. The data transfer device 500 further includes a vehicle speed notifying unit 403, an accumulation amount calculating unit 404, a determination unit 405, a data processing unit 406, a storage control unit 407, and a communication unit 400. A hardware configuration of the data transfer device 500 can be achieved by, for example, the configuration illustrated in FIG. 2 as in the first embodiment.

(Communication Unit)

The communication unit 400 acquires, from a server 102, the amount of data that has been actually transmitted from the communication unit 400 of a vehicle to the server 102 within a certain time during traveling, that is, a measured value of a mobile data communication speed (a value of a fourth data communication speed), information on a time when the data was transmitted to the server 102, and information on a position where the data was transmitted to the server 102 (hereinafter, these pieces of information are collectively referred to as "actual mobile data communication speed information"). The communication unit 400 transmits the actual mobile data communication speed information acquired from the server 102 to the accumulation amount calculating unit 404.

(Vehicle Speed Notifying Unit)

The vehicle speed notifying unit 403 stores, in a memory 202, a measured value of the vehicle speed on the route on which the vehicle has traveled, time information during traveling, and position information during traveling (hereinafter, these pieces of information are collectively referred to as "actual vehicle speed information"). Then, the vehicle speed notifying unit 403 transmits the stored actual vehicle speed information to the accumulation amount calculating unit 404 at a predetermined timing. For example, the actual vehicle speed information may be transmitted at a predetermined period such as every five minutes or every ten minutes, or may be transmitted at a timing when the vehicle passes through a predetermined position such as when the vehicle passes through a node connecting different links to each other in the route on which the vehicle has traveled.

(Accumulation Amount Calculating Unit)

The accumulation amount calculating unit 404 performs calculation to correct the sensor data communication speed using the actual mobile data communication speed information acquired from the communication unit 400 and the actual vehicle speed information acquired from the vehicle speed notifying unit 403. A calculation example will be described below. First, scales of pieces of the information are adjusted. For example, by using time information of the actual mobile data communication speed information and time information of the actual vehicle speed information, a time axis of the vehicle speed measured value, a time axis of the measured value of the mobile data communication speed, and a time axis of the temporal transition of the predicted storage accumulation amount calculated in step B2 are adjusted so as to be matched with each other. As another example, by using position information of the actual mobile data communication speed information and position information of the actual vehicle speed information, a measurement point of the vehicle speed measured value, a measurement point of the measured value of the mobile data communication speed, and a measurement point of the temporal transition of the predicted storage accumulation amount calculated in step B2 may be adjusted so as to be matched with each other.

After the scales are adjusted in this manner, a value of each variable is put into the right side of the following equation (2), and a corrected sensor data communication speed is calculated. Note that the value of the communication speed in the sensor information table of FIG. 6 is used as the value of the sensor data communication speed.

$$\text{Corrected sensor data communication speed} = \\ \text{Sensor data communication speed} * (\text{vehicle speed} \\ \text{measured value/predicted vehicle speed value}) + \\ \alpha * (\text{mobile data communication speed measured value} - \\ \text{mobile data communication speed predicted value})$$

Equation (2)

In equation (2), the coefficient α is a coefficient that is changed according to characteristics of a road such as a tunnel and a mountain portion.

In the first term on the right side of equation (2), the predicted vehicle speed value is corrected with the vehicle speed measured value. In the second term on the right side, the mobile data communication speed predicted value (a value of a second data communication speed) is corrected with the mobile data communication speed measured value (the value of the fourth data communication speed). The corrected sensor data communication speed is calculated using these corrected values.

After calculating the corrected sensor data communication speed, the accumulation amount calculating unit 404 changes a value in a column of the communication speed in the sensor information table. Furthermore, the accumulation amount calculating unit 404 changes the period or frequency, resolution, or compression ratio of the sensor in the sensor information table in such a manner that the sensor data communication speed is the calculated sensor data communication speed. Furthermore, using the corrected sensor data communication speed, the accumulation amount calculating unit 404 calculates again the temporal transition of the predicted storage accumulation amount after a time when the corrected value of the sensor data communication speed is calculated as in the first embodiment. The accumulation amount calculating unit 404 transmits the information on the changed sensor information table to the determination unit 405 in addition to the information on the temporal transition of the corrected predicted storage accumulation amount.

(Determination Unit)

The determination unit 405 determine whether or not overflow will occur in the storage as in the first embodiment using the information on the temporal transition of the corrected predicted storage accumulation amount. When overflow will occur, the determination unit 405 notifies the accumulation amount calculating unit 404 that overflow will occur, and the accumulation amount calculating unit 404 calculates a total communication speed at which no overflow occurs. When no overflow will occur, processing information (a period or a frequency, a resolution, or a compression ratio) of various sensors in the sensor information table is transmitted to the data processing unit 406.

(Data Processing Unit and Storage Control Unit)

As in the first embodiment, the data processing unit 406 processes the sensor data according to the processing information received from the determination unit 405, and the storage control unit 407 accumulates the processed sensor data in the storage of the memory 202.

<Operation>

Figure 10:
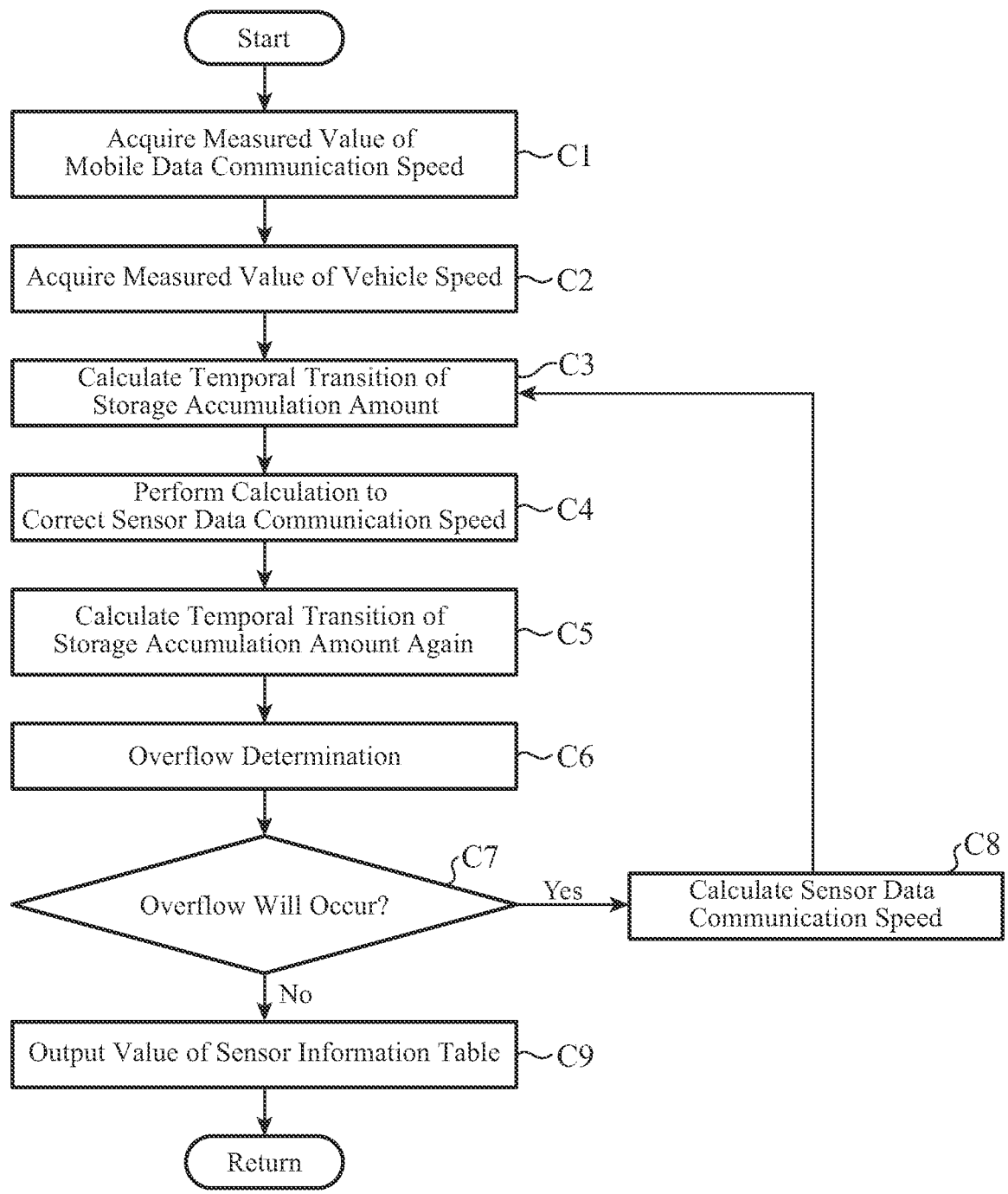
FIG. 10 is a flowchart illustrating a subroutine of sensor data communication speed calculating processing according to the second embodiment.

Next, an operation of the data transfer device 500 will be described with reference to FIG. 10. The second embodiment is different from the first embodiment in processing performed as a subroutine of step A3 in FIG. 7. In the second embodiment, processing according to the flowchart of FIG. 10 is performed instead of the flowchart of FIG. 8 in the first embodiment. Hereinafter, processing performed as a subroutine of step A3 in FIG. 7 will be described with reference to FIG. 10.

In step C1, the accumulation amount calculating unit 404 acquires, from the server 102 via the communication unit 400, the amount of data that has been transmitted from the vehicle to the server 102 in the route on which the vehicle has traveled (that is, the measured value of the mobile data communication speed), the time information, and the position information.

In step C2, the accumulation amount calculating unit 404 acquires, from the vehicle speed notifying unit 403, the vehicle speed measured value, the time information, and the position information in the route on which the vehicle has traveled.

In step C3, the accumulation amount calculating unit 404 calculates the temporal transition of the predicted storage accumulation amount as in step B2.

In step C4, the accumulation amount calculating unit 404 performs calculation to correct the sensor data communication speed according to equation (2) using the values acquired in steps C1 and C2 and the temporal transition of the predicted storage accumulation amount calculated in step C3. Then, the sensor information table is rewritten using the calculation result.

In step C5, the accumulation amount calculating unit 404 calculates the temporal transition of the predicted storage accumulation amount again using the corrected sensor data communication speed. The accumulation amount calculating unit 404 transmits the corrected temporal transition of the predicted storage accumulation amount to the determination unit 405.

In step C6, the determination unit 405 determines whether or not overflow will occur using the corrected temporal transition of the predicted storage accumulation amount.

If it is determined that no overflow will occur, the process branches at step C7 and proceeds to step C9. In step C9, the determination unit 405 outputs a value of the sensor information table to the data processing unit 406.

If it is determined that overflow will occur, the process branches at step C7 and proceeds to step C8. In step C8, the determination unit 405 notifies the accumulation amount calculating unit 404 that overflow will occur, and the accumulation amount calculating unit 404 calculates a sensor data communication speed at which no overflow occurs.

According to the data transfer device 500 as described above, the communication unit 400 is configured to acquire, from the server 102, the measured value of the mobile data communication speed (the value of the fourth data communication speed) related to the sensor data that has been actually transmitted from the communication unit 400 to the server 102. In addition, the vehicle speed notifying unit 403 is configured to give a notification of an actual vehicle speed in a case where the vehicle has traveled on a part of the travel route on which the vehicle has traveled. In addition, the accumulation amount calculating unit 404 is configured to correct the temporal transition of the predicted accumulation amount by correcting a value of the predicted mobile data communication speed (the value of the second data communication speed) with the measured value of the mobile data communication speed (the fourth data communication speed) and correcting the predicted vehicle speed with the actual vehicle speed. Therefore, it is possible to increase the accuracy of the temporal transition of the predicted accumulation amount. Since the prediction accuracy is improved, occurrence of overflow in the memory can be appropriately suppressed.

<Supplementary Note>

Some aspects of the embodiments described above are summarized below.

(Supplementary Note 1)

A data transfer device (100, 500) according to supplementary note 1 includes: a data acquisition unit (301) that acquires sensor data detected by a sensor (101) at a first data communication speed; a communication unit (300, 400) that transmits the acquired sensor data to a server at a second data communication speed; an accumulation amount calculating unit (304, 404) that calculates a temporal transition of a predicted accumulation amount of the acquired sensor data in a memory using the first data communication speed and the second data communication speed; and a determination unit (305, 405) that determines whether or not the sensor data to be accumulated in the memory will overflow on the basis of the temporal transition of the predicted accumulation amount.

(Supplementary Note 2)

A data transfer device according to supplementary note 2 is the data transfer device according to supplementary note 1, further including a data processing unit (306, 406) that processes the sensor data according to processing information, in which the accumulation amount calculating unit is configured to calculate a third data communication speed at which overflow does not occur and to update the processing information when the sensor data to be accumulated in the memory is determined to overflow, the data processing unit is configured to process the acquired sensor data according to the updated processing information, and the communication unit is configured to transmit the processed sensor data to the external server.

(Supplementary Note 3)

A data transfer device according to supplementary note 3 is the data transfer device according to supplementary note 1 or 2, in which the sensor includes a plurality of sensors, the data acquisition unit is configured to acquire sensor data from each of the sensors, and the data processing unit is configured to process the sensor data from each of the sensors on the basis of a priority assigned to each of the sensors.

(Supplementary Note 4)

A data transfer device according to supplementary note 4 is any one of the data transfer devices according to supplementary notes 1 to 3, further including: a travel route notifying unit (302) to notify a travel route on which a vehicle is scheduled to travel; and a vehicle speed notifying unit (303, 403) to predict and notify a vehicle speed of the vehicle on the notified travel route, in which the accumulation amount calculating unit is configured to calculate a temporal transition of the predicted accumulation amount using the predicted vehicle speed in addition to the first data communication speed and the second data communication speed.

(Supplementary Note 5)

A data transfer device according to supplementary note 5 is the data transfer device according to supplementary note 4, in which the communication unit is configured to acquire, from the external server, a fourth data communication speed of sensor data actually transmitted from the communication unit to the external server, the vehicle speed notifying unit is configured to notify an actual vehicle speed at which the vehicle has traveled a part of the travel route, and the accumulation amount calculating unit is configured to correct a temporal transition of the predicted accumulation amount by correcting the second data communication speed with the fourth data communication speed and correcting the predicted vehicle speed with the actual vehicle speed.

(Supplementary Note 6)

A data transfer method according to supplementary note 6 includes: acquiring sensor data detected by a sensor at a first data communication speed; transmitting the acquired sensor data to an external server at a second data communication speed; calculating a temporal transition of a predicted accumulation amount of the acquired sensor data in a memory using the first data communication speed and the second data communication speed; and determining whether or not the sensor data to be accumulated in the memory will overflow on the basis of the temporal transition of the predicted accumulation amount.

Note that the embodiments can be combined, and each of the embodiments can be appropriately modified or omitted.

INDUSTRIAL APPLICABILITY

The data transfer device according to the present disclosure can collect sensor data even from an area with a low wireless communication line speed. Therefore, the data transfer device according to the present disclosure can be used as an in-vehicle device mounted on a vehicle.

REFERENCE SIGNS LIST

10: data transfer system, 100: data transfer device, 101 (101-1 to 101-n): sensor, 102: server, 103: vehicle, 200: external network I/F, 201: processor, 202: memory, 202a: ROM, 202b: RAM, 203: internal network I/F, 300: communication unit, 301: data acquisition unit, 302: travel route notifying unit, 303: vehicle speed notifying unit, 304: accumulation amount calculating unit, 305: determination unit, 306: data processing unit, 307: storage control unit, 400: communication unit, 403: vehicle speed notifying unit, 404: accumulation amount calculating unit, 405: determination unit, 406: data processing unit, 407: storage control unit, 500: data transfer device

The invention claimed is:

1. A data transfer device comprising:
   a processor to execute a program; and
   a memory to store the program which, when executed by the processor, performs processes of,
   acquiring sensor data detected by a sensor at a first data communication speed,
   transmitting the acquired sensor data to an external server at a second data communication speed,
   calculating a temporal transition of a predicted accumulation amount of the acquired sensor data in the memory using the first data communication speed and the second data communication speed,
   determining whether or not the sensor data to be accumulated in the memory will overflow on a basis of the temporal transition of the predicted accumulation amount;
   notifying a travel route on which a vehicle is scheduled to travel;
   predicting and notifying a vehicle speed of the vehicle on the notified travel route; and
   calculating the temporal transition of the predicted accumulation amount using the predicted vehicle speed in addition to the first data communication speed and the second data communication speed.

2. The data transfer device according to claim 1, the processes further comprising:
   processing the sensor data according to processing information;
   calculating a third data communication speed at which overflow does not occur and updating the processing information when the sensor data to be accumulated in the memory is determined to overflow;
   processing the acquired sensor data according to the updated processing information; and
   transmitting the processed sensor data to the external server.

3. The data transfer device according to claim 2, wherein the sensor includes a plurality of sensors,
the processes further comprising:
acquiring sensor data from each of the sensors; and
processing the sensor data from each of the sensors on a basis of a priority assigned to each of the sensors.

4. The data transfer device according to claim 1, the processes further comprising:
acquiring, from the external server, a fourth data communication speed of sensor data actually transmitted to the external server;
notifying an actual vehicle speed at which the vehicle has traveled a part of the travel route; and
correcting a temporal transition of the predicted accumulation amount by correcting the second data communication speed with the fourth data communication speed and correcting the predicted vehicle speed with the actual vehicle speed.

5. The data transfer device according to claim 1,
wherein the memory and the processor are included in a vehicle configured to drive on a road, and
wherein the vehicle is separate from the external server.

6. The data transfer device according to claim 1, wherein calculating the temporal transition depends on a predicted vehicle speed of the vehicle.

7. The data transfer device according to claim 1, wherein calculating the temporal transition depends on a predicted travel time of the vehicle.

8. A data transfer method comprising:
acquiring sensor data detected by a sensor at a first data communication speed;
transmitting the acquired sensor data to an external server at a second data communication speed;
calculating a temporal transition of a predicted accumulation amount of the acquired sensor data in a memory, of a device comprising the sensor, using the first data communication speed and the second data communication speed;
determining whether or not the sensor data to be accumulated in the memory will overflow on a basis of the temporal transition of the predicted accumulation amount;
notifying a travel route on which a vehicle is scheduled to travel;
predicting and notifying a vehicle speed of the vehicle on the notified travel route; and
calculating a temporal transition of the predicted accumulation amount using the predicted vehicle speed in addition to the first data communication speed and the second data communication speed.

* * * * *